United States Patent [19]

Jones

[11] Patent Number: 5,194,325
[45] Date of Patent: Mar. 16, 1993

[54] MOLDED POLYURETHANE FOAM SYSTEM UTILIZING HFC BLOWING AGENTS

[75] Inventor: Thomas N. Jones, Pinckney, Mich.

[73] Assignee: Renosol Corporation, Ann Arbor, Mich.

[21] Appl. No.: 841,098

[22] Filed: Feb. 25, 1992

[51] Int. Cl.$^5$ ............... B32B 3/26; B32B 27/40; C08J 9/34
[52] U.S. Cl. ............... 428/318.6; 264/45.5; 428/318.8; 521/51; 521/904; 521/909
[58] Field of Search ............ 521/51, 909, 904; 428/318.8, 318.6; 264/45.5

[56] References Cited

U.S. PATENT DOCUMENTS

| | | | |
|---|---|---|---|
| Re. 31,757 | 12/1984 | Kennedy | 521/103 |
| 3,640,916 | 2/1972 | Dill | 521/72 |
| 4,291,129 | 9/1981 | Kennedy | 521/103 |
| 4,318,999 | 3/1982 | Dunlop et al. | 521/171 |
| 4,524,102 | 6/1985 | Hostettler | 521/51 |
| 4,528,300 | 7/1985 | Park | 521/79 |
| 4,546,122 | 10/1985 | Radovich et al. | 521/51 |
| 4,923,654 | 5/1990 | Freeland | 264/53 |
| 4,925,606 | 5/1990 | Francis et al. | 521/79 |
| 4,931,483 | 6/1990 | Matsuoka et al. | 521/137 |
| 4,943,223 | 7/1990 | Panaroni | 425/116 |
| 4,956,395 | 9/1990 | Leduc | 521/79 |
| 4,966,497 | 10/1990 | Kirby | 405/232 |
| 5,100,922 | 3/1992 | Wada et al. | 521/51 |

OTHER PUBLICATIONS

"Polyurethane" by Henri Ulrich, *Modern Plastics Encyclopedia,* (1985-1986), pp. 78, 80, 82.
"Soluble or Insoluble Alternative Blowing Agents? Processing Technologies for Both Alternatives, Presented by the Equipment Manufacturer," by M. Taverna and L. Hufnagel, Polyurethanes World Congress, 1991, pp. 141-147.
*Hawley's Condensed Chemical Dictionary,* Eleventh Edition, Revised by N. Irving Sax and Richard J. Lewis, Sr., pp. 158, 533, 534 (1987).
*McGraw-Hill Encyclopedia of Science & Technology,* 6th Edition, by Van Nostrand Reinhold Company, Inc., p. 39 (1987).
DuPont literature on HFC blowing agents; "Alternatives to Chlorofluorocarbons", (no date) 7 pages.

*Primary Examiner*—William J. Van Balen
*Attorney, Agent, or Firm*—Harness, Dickey & Pierce

[57] ABSTRACT

A molded polyurethane foam system utilizing hydrofluorocarbons and alkane hydrocarbons as the blowing agent. The molded polyurethane foam products of the invention have a high-density integral skin and a low-density core. The blowing agent can be the HFC, tetrafluoroethane (HFC-134a) chemical alone or a mixture of tetrafluoroethane (HFC-134a) with one or more of the following: alkanes (such as 2-methylbutane, pentane and heptane) and other inert volatile organic compounds with boiling points in the 15°-100° C. range (such as pentene and acetone).

2 Claims, No Drawings

MOLDED POLYURETHANE FOAM SYSTEM UTILIZING HFC BLOWING AGENTS

FIELD OF THE INVENTION

The present invention relates to molded polyurethane foam systems and particularly polyurethane foam systems utilizing a hydrofluorocarbon-containing blowing agent system for making flexible and semi-flexible foam products with integral skins.

DESCRIPTION OF THE RELATED ART

Polyurethanes are addition polymers commonly obtained from the chemical reaction of an isocyanate and a polyol, which occurs readily at various temperatures (even room temperature) in the presence of a catalyst Examples of typical isocyanates include, without limitation, toluene diisocyanate (TDI), methylene diphenylisocyanate (MDI), and polymethylene polyphenyl isocyanate (polymeric MDI). Polyols may be macroglycols which are either polyether or polyester based. see, e.g. "Polyurethane" by Henri Ulrich, *Modern Plastics Encyclopedia*, p. 78 (1985-1986) (incorporated by reference). For the production of foamed products, advantage is taken of the fact that an isocyanate group can react with water alone or water in the presence of a blowing or foaming agent to yield among other things, a gas which causes the formation of pores or cells (either open or closed or both), hence a foam.

Chemical blowing agents which have been employed singularly in the past are those which consist of alkane hydrocarbons, chlorofluorocarbons (CFCs), or other volatile organic compounds. CFCs are low in toxicity, nonflammable and noncorrosive. However, the stability of these agents coupled with their chlorine content has linked them to possible depletion of the earth's protective ozone layer. Thus, alternative urethane foam blowing agents which would be more friendly to the environment are very desirable. Hydrofluorocarbons (HFCs) exhibit properties and performance characteristics similar to CFCs, but generally with greatly reduced environmental impact. Because HFCs have a hydrogen in the molecule, the compound tends to be less stable and react more readily in the lower atmosphere, which leads to a shorter atmospheric lifetime than CFCs. Furthermore, the HFCs contain no chlorine, thus HFCs are believed to be less detrimental to the ozone.

Although many commercially acceptable blowing agents are presently available, there is a continued search in the art for improved blowing agents. Accordingly, it is an object of this invention to provide improved urethane foam systems which utilize an HFC-containing blowing agent. It is a further object of this invention to provide a polyurethane foam blowing agent that utilizes an HFC in a specific combination with an alkane hydrocarbon that will allow the formation of a dense outer skin and lower core foam density when the core with flexible or semi-flexible foam skin is formed in a mold.

A general survey of the literature reveals the following background items (Incorporated by reference): U.S. Pat. Nos. 4,956,395 (Leduce); 4,966,497 (Kirby); 4,943,223 (Panaroni); 4,931,483 (Matsouka et al); 4,925,606 (Francis et al); 4,923,654 (Freeland); 4,528,330 (Park); Re. 31,757 (Kennedy); 4,318,999 (Dunlop et al); 4,291,129 (Kennedy); 3,640,916 (Dill); and DuPont literature on HFC blowing agents.

SUMMARY OF THE INVENTION

The present invention is directed to achieving the foregoing objects by providing an improved method of making a polyurethane foam article, such as one having an integral skin, which includes the steps of reacting an isocyanate and a polyol in the presence of a blowing agent which includes the HFC, tetrafluoroethane (HFC-134a) chemical alone or a mixture of tetrafluoroethane (HFC-134a) with one or more of the following: alkanes (such as methylbutane, pentane and heptane) and other inert volatile organic compounds with boiling points in the 15°-100° C. range (such as pentene and acetone).

The present invention provides a unique blowing agent useful in the production of polyurethane foams, but with greatly reduced environmental impact. Without intending to be limited hereby, the HFCs of the present invention do not contain chlorine, and therefore should have a zero ozone depletion potential. The hydrogen in the HFC molecules causes these compounds to be less stable in the atmosphere than CFCs, and to have greatly reduced atmospheric lifetimes.

Further, a preferred HFC used in the present invention, tetrafluoroethane, offers reduced toxicity, improved in-use stability, and substantially no risk of flammability or smog production. Thus, while HFCs exhibit properties and performance characteristics which may be similar to CFCs, they do so with an anticipated greatly reduced environmental impact.

Further objects, features and advantages of the invention will become apparent from a consideration of the following description and the appended claims.

DETAILED DESCRIPTION OF THE PREFERRED EMBODIMENT

The present method of forming a flexible self-skinning foam material includes the steps of:

a) reacting a pre-determined amount of a polyol, an isocyanate, and a blowing agent wherein the blowing agent includes a hydrofluorocarbon; and b) molding the reaction product of said reacting step (a).

By "self-skinning" as used herein is meant a process whereby a first layer of a polyurethane foam is disposed immediately adjacent to and contiguous with a second layer of polyurethane foam. The first layer has a density greater than the second layer. Self skinning processes thus lead to the formation of a skin (i.e., the above-noted first layer) referred to as an "integral skin" herein.

The reacting step (a) preferably employs reacting under any suitable reaction condition a predetermined amount of the polyol, the isocyanate and the blowing agent either in the presence or absence of conventional additives and agents for urethane polymer systems. It shall be appreciated that the present invention is not limited to a polyol-isocyanate system, but that other urethane polymer systems such as systems including a diamine and/or polyamine may be also employed.

The polyols of the present invention may be any suitable conventional polyol, such as polyester and/or polyether-based polyol polymers, preferably containing two or more hydroxyl functional groups. Examples of suitable polyester-typed polyols include those prepared by reacting a glycol and a saturated dibasic acid, e.g., polyethylene adipate or polytetramethylene adipate. A preferred polyether-type polyol is based on systems employing polyalkylene oxide, and has a molecular weight typically ranging from about 150 to about 10,000.

The isocyanates of the present invention preferably are aromatic isocyanates, though the skilled artisan will appreciate that any suitable isocyanate may be employed. Examples of preferred isocyanates are toluene diisocyanate (TDI), methylene diphenylisocyanate (MDI) and polymethylene polyphenylisocyanate (polymeric MDI). Aliphatic diisocyanates may also be employed such as where light stability of the derived polyurethane is desired.

The hydrofluorocarbon can be generally represented by the formula:

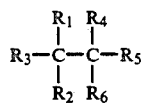

wherein $R_1$ and $R_2$ are independently selected from hydrogen or straight or branched chain alkyls and $R_3$ through $R_5$ are independently selected from flourine, flourine containing groups, or mixtures thereof.

The preferred hydrofluorocarbon of the present invention is tetrafluoroethane ($CH_2FCF_3$) which has a molecular weight of about 102 and a boiling point (at 1 atm) of about $-26.50°$ C. An example of a preferred commeroially available blowing agent is HFC$-$134a, supplied under that trade name by DuPont.

The alkane hydrocarbon of the present invention can be generally represented by the formula:

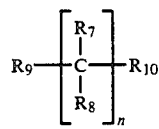

wherein $R_7$ and $R_5$ preferably are independently selected form hydrogen or straight or branched chain alkyls and n is an integer from 1 to 7. Any suitable end group $R_9$ and $R_{10}$ may be employed, such as hydrogen. The preferred alkane hydrocarbon is pentane.

The blowing agent composition of the present invention preferably comprises from about 50 to about 99 weight percent (of the blowing agent system) hydrofluorocarbon, and about 1 to about 50 weight percent (of the blowing agent system) alkane hydrocarbon. In a highly preferred embodiment, the composition of the blowing agent is from about 50 to about 99 weight percent (of the blowing agent system) tetrafluoroethane, and about 1 to about 50 percent (of the blowing agent system) pentane. Preferably, the blowing agent is used in the range of about 1 to about 15 weight percent of the total weight of the polyurethane system in which it is used. Preferably, the ratio of the hydrofluorocarbon to alkane hydrocarbon ranges from about 100:1 to about 1:1.

In another embodiment of the present invention, tetrafluoroethane is used exclusively (i.e., without the alkane hydrocarbon) in the range of about 1 to about 15 weight percent of the blowing agent formula of the other polyurethane system chemicals.

In order to produce a polyurethane foam according to the method of the present invention, the formulated polyurethane chemicals are generally compounded into two liquid components. These formulated liquid components are referred to as a "polyurethane system". The isocyanate or blend of isocyanates comprises one of the components. The other component consists of the polyol(s), (optionally chain extender(s) (lower molecular weight molecules containing polyfunctional groups), catalysts(s), or other additives), and the blowing agent. In the process to produce a polyurethane foam, these components are proportioned by either weight or volume in suitable amounts and then thoroughly mixed together. This mixture is then poured or injected into a mold where the foam is formed.

Although proportioning two components is most common in foam production, metering multiple streams of polyurethane chemicals to produce a foam is also frequently employed. The time, temperatures and pressures employed during molding may vary as the skilled artisan appreciates. During admixing or otherwise prior to molding, the blowing agent may be metered as a third stream or preferably dissolved into the polyol component to introduce it into the system.

The result is an article of manufacture comprising a compressible foam core and a flexible skin, wherein the core is integrally connected to the skin, the core and skin both being the result of a reaction between a polyol and an isocyanate in the presence of the blowing agent of this invention. The blowing agent of the present invention provides a high-density integral skin, namely, a skin with a higher density than the core foam. One skilled in the art will appreciate how skin thickness and other properties may be varied to achieve desired results. The flexible or semi-flexible nature of the skin is an inherent result of a conventional resilient urethane foam molding process utilizing the blowing agent of this invention. The term "resilient urethane foam" means a foam which compresses under a compression load and expands when the load is released. This contrasts with structural foam which is hard, dense and noncompressible.

Polyurethane articles find use in many environments such as in shoes, exercise equipment, automobiles, etc. For instance, in the automotive industry, the potential uses range, without limitation, from headliners, to instrument panels, to steering wheels, arm rests, doorpanels, and so on. The present invention is particularly useful in the production of shoe soles.

It is understood that the invention is not limited to the exact formulation and use described above, but the various changes and modifications may be made without departing from the spirit and scope of the invention as defined in the following claims.

What is claimed is:

1. A method of making a foamed article, said method comprising the steps of:
   (a) reacting:
      (i) an admixture containing a polyol and an isocyanate; and
      (ii) about 1 to about 15%, by weight of the final composition, of a blowing agent system containing about 50 to about 99 parts, by weight of the total blowing agent system, of tetrafluoroethane and about 1 to about 50 parts, by weight of the total blowing agent system, of pentane; and
   (b) molding the reaction product resulting from said reacting step(a) to form a foamed article with a foam core having a first density, and a skin having a second density, said skin being integrally connected to said foam core, said second density being greater than said first density.

2. A foamed article, comprising:
(a) a foam core having a first density; and
(b) a skin having a second density, said skin being integrally connected to said foam core, said second density being greater than said first density, said article being made by reacting:
  (i) an admixture containing a polyol and an isocyanate; and
  (ii) about 1 to about 15%, by weight of the final composition, of a blowing agent system containing about 50 to about 99 parts, by weight of the total blowing agent system, of tetrafluoroethane and about 1 to about 50 parts, by weight of the total blowing agent system, of pentane; and molding the product of said reaction.

* * * * *